(12) United States Patent
Kataoka

(10) Patent No.: US 11,476,939 B2
(45) Date of Patent: Oct. 18, 2022

(54) OPTICAL REPEATER, TRANSMISSION PATH FIBER MONITORING METHOD, AND OPTICAL TRANSMISSION SYSTEM

(71) Applicant: NEC CORPORATION, Tokyo (JP)

(72) Inventor: Hiroaki Kataoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 16/970,024

(22) PCT Filed: Feb. 28, 2019

(86) PCT No.: PCT/JP2019/007814
§ 371 (c)(1),
(2) Date: Aug. 14, 2020

(87) PCT Pub. No.: WO2019/168099
PCT Pub. Date: Sep. 6, 2019

(65) Prior Publication Data
US 2021/0111801 A1    Apr. 15, 2021

(30) Foreign Application Priority Data
Mar. 2, 2018 (JP) .............................. JP2018-037453

(51) Int. Cl.
*H04B 10/00* (2013.01)
*H04B 10/293* (2013.01)
(Continued)

(52) U.S. Cl.
CPC ....... *H04B 10/2933* (2013.01); *H01S 3/0677* (2013.01); *H01S 3/06758* (2013.01); *H01S 3/06766* (2013.01); *H04B 10/071* (2013.01)

(58) Field of Classification Search
CPC combination set(s) only.
See application file for complete search history.

(56) References Cited

U.S. PATENT DOCUMENTS

| | | | |
|---|---|---|---|
| 5,790,294 A * | 8/1998 | Horiuchi | H04B 10/07 398/32 |
| 6,301,036 B1 * | 10/2001 | Spencer | H04B 10/2589 398/31 |

(Continued)

FOREIGN PATENT DOCUMENTS

| | | |
|---|---|---|
| EP | 3439201 A1 | 2/2019 |
| JP | 09-116502 A | 5/1997 |

(Continued)

OTHER PUBLICATIONS

Extended European Search Report for EP Application No. EP19760583.5 dated Apr. 13, 2021.

(Continued)

*Primary Examiner* — Agustin Bello
(74) *Attorney, Agent, or Firm* — Sughrue Mion, PLLC

(57) ABSTRACT

An optical repeater is a C+L-band repeater inserted between a first transmission path fiber and a second transmission path fiber. The optical repeater includes: a first optical fiber amplifier inserted in a first line, for amplifying a C-band signal; a second optical fiber amplifier inserted in a second line, for amplifying an L-band signal; a third optical fiber amplifier inserted in a third line, for amplifying a C-band signal; a fourth optical fiber amplifier inserted in a fourth line, for amplifying an L-band signal; and a first loopback means provided between an input to the first optical fiber amplifier or an output from the first optical fiber amplifier and an input to the third optical fiber amplifier or an output from the third optical fiber amplifier.

13 Claims, 7 Drawing Sheets

(51) Int. Cl.
*H01S 3/067* (2006.01)
*H04B 10/071* (2013.01)

(56) References Cited

U.S. PATENT DOCUMENTS

| | | | | |
|---|---|---|---|---|
| 6,603,587 | B1* | 8/2003 | Yokoyama | H04B 10/0777 398/79 |
| 6,708,004 | B1 | 3/2004 | Homsey | |
| 6,882,466 | B1* | 4/2005 | Shimojoh | H01S 3/06758 359/341.33 |
| 7,388,657 | B2* | 6/2008 | Abbott | H04B 10/071 356/73.1 |
| 7,684,711 | B2* | 3/2010 | Desbruslais | H04B 10/0771 398/135 |
| 8,135,274 | B2* | 3/2012 | Zhang | H04B 10/035 398/31 |
| 9,124,362 | B2* | 9/2015 | Grasso | H04B 10/298 |
| 9,130,672 | B2* | 9/2015 | Zhang | H04B 10/298 |
| 9,276,672 | B2* | 3/2016 | Zhang | H04B 10/0771 |
| 9,749,041 | B2* | 8/2017 | Kram | H04B 10/0773 |
| 10,404,362 | B1* | 9/2019 | Xu | H04B 10/0791 |
| 10,498,438 | B2* | 12/2019 | Xu | H04B 10/0775 |
| 10,587,343 | B2* | 3/2020 | Mikami | H04B 10/077 |
| 10,833,766 | B2* | 11/2020 | Ait Sab | H04B 10/077 |
| 10,958,370 | B2* | 3/2021 | Mikami | H04B 10/291 |
| 11,095,370 | B2* | 8/2021 | Ruggeri | H04B 10/25 |
| 11,101,885 | B2* | 8/2021 | Ait Sab | H04B 10/0777 |
| 2002/0131696 | A1* | 9/2002 | Yokoyama | H04B 10/0777 385/27 |
| 2005/0226614 | A1* | 10/2005 | Ogiwara | H04B 10/298 398/37 |
| 2007/0041006 | A1* | 2/2007 | Abbott | H04B 10/071 356/73.1 |
| 2009/0154919 | A1* | 6/2009 | Desbruslais | H04B 10/0771 398/136 |
| 2009/0324249 | A1* | 12/2009 | Zhang | H04B 10/071 398/173 |
| 2014/0086573 | A1* | 3/2014 | Zhang | H04B 10/80 398/16 |
| 2019/0097727 | A1* | 3/2019 | Mikami | H04B 10/077 |
| 2019/0260468 | A1* | 8/2019 | Xu | H04B 10/071 |
| 2019/0348812 | A1* | 11/2019 | Kawai | H04J 14/06 |
| 2020/0195341 | A1* | 6/2020 | Ait Sab | H04J 14/0279 |
| 2021/0111801 | A1* | 4/2021 | Kataoka | H01S 3/0677 |

FOREIGN PATENT DOCUMENTS

| | | |
|---|---|---|
| JP | 2001-044546 A | 2/2001 |
| JP | 2003-134089 A | 5/2003 |
| JP | 2007-060665 A | 3/2007 |
| WO | 2017/170004 A1 | 10/2017 |
| WO | WO-2017170004 A1 * | 10/2017 ........... H04B 10/035 |

OTHER PUBLICATIONS

Gautheron et al., "COTDR performance optimization for amplified transmission systems", IEEE Photonics Technology Letters, IEEE Service Center, Piscataway, NJ, US, vol. 9, No. 7, Jul. 1, 1997 (Jul. 1, 1997), pp. 1041-1043, XP011431297.
Written Opinion for PCT/JP2019/007814, dated Apr. 23, 2019.
International Search Report for PCT/JP2019/007814, dated Apr. 23, 2019.

* cited by examiner

OPTICAL REPEATER, TRANSMISSION PATH FIBER MONITORING METHOD, AND OPTICAL TRANSMISSION SYSTEM

CROSS REFERENCE TO RELATED APPLICATIONS

This application is a National Stage of International Application No. PCT/JP2019/007814 filed Feb. 28, 2019, claiming priority based on Japanese Patent Application No. 2018-037453 filed Mar. 2, 2018, the disclosure of which is incorporated herein in its entirety by reference.

TECHNICAL FIELD

The present invention relates to an optical repeater, a transmission path fiber monitoring method, and an optical transmission system, and particularly, relates to an optical repeater, a transmission path fiber monitoring method, and an optical transmission system that are suitable to be used in a wavelength division multiplexing (WDM) communication technique.

BACKGROUND ART

An optical transmission system of a wavelength division multiplexing (WDM) communication technique transmits a multiple-wavelength optical signal by using one optical fiber, and thereby, can enhance transmission efficiency. Expansion of a transmission bandwidth of a wavelength division multiplexing communication system is required due to an increasing data amount, and, as one means thereof, there is a wide-band transmission system that simultaneously utilizes a conventional band (C-band) and a long band (L-band). Generally, the C-band has a bandwidth of 1525 nm to 1568 nm, and the L-band has a bandwidth of 1568 nm to 1625 nm. A C+L-band repeater is used in a wide-band transmission system that simultaneously utilizes the C-band and the L-band. In the C+L-band repeater, a technique that performs optical amplification by use of an erbium doped fiber (EDF) is widely spread.

Patent literature 1 (PTL1) relates to a wavelength multiplexing transmission system, and suggests a C+L repeater by a technique that performs amplification by splitting into the C-band and the L-band.

Optical time domain reflectometry (OTDR) is known as a scheme of detecting a path fault in an optical transmission system. Patent literature 2 (PTL2) relates to an optical amplification repeater, and suggests performing an optical pulse test by OTDR, by connecting an optical amplifier output in a transmission direction and an optical amplifier output in a reception direction with a loopback circuit.

CITATION LIST

Patent Literature

[PTL1] Japanese Application Laid-open No. 2001-44546
[PTL2] Japanese Application Laid-open No. H09-116502

SUMMARY OF INVENTION

Technical Problem

When optical amplification is performed over a plurality of bands with an optical repeater, a technique that demultiplexes an optical transmission path for each band, and places an optical amplifier optimized for each band can be conceived. A loopback circuit for OTDR is generally placed outside as an optical path of a repeater. Herein, application of the loopback circuit for OTDR to a C+L repeater is assumed.

When the loopback circuit for OTDR is applied to the C+L repeater, an additional device for a common path of a C-band and an L-band increases, and a loss of a main signal path increases. Meanwhile, when a configuration in which a loopback circuit is disposed on a C-band path inside a repeater is formed in order to avoid such increase of loss, this configuration is unable to detect a fault on an L-band path inside the repeater.

Generally, as compared with an optical amplifier of the C-band, an optical amplifier of the L-band has a poor noise figure (NF) characteristic of the optical amplifier, and is low in output power efficiency for excitation light power. Thus, when loopback circuits for an optical amplifier output in a transmission direction and an optical amplifier input in a reception direction are disposed on a path of the L-band as in a path of the C-band, an insertion loss increase of a main signal on the L-band resulting from an additional device becomes non-negligible.

Thus, an object of the present invention is to provide an optical repeater and an optical transmission system that are capable of OTDR measurement and state diagnoses of a transmission path fiber and the optical repeater by the OTDR measurement while suppressing an insertion loss increase of a main signal, and an optical transmission system.

Solution to Problem

In order to accomplish the object described above, an optical repeater according to the present invention is a C+L-band repeater inserted between a first transmission path fiber and a second transmission path fiber, and includes:

a first optical fiber amplification unit inserted in a first line, and amplifying a C-band signal;

a second optical fiber amplification unit inserted in a second line, and amplifying an L-band signal;

a third optical fiber amplification unit inserted in a third line, and amplifying a C-band signal;

a fourth optical fiber amplification unit inserted in a fourth line, and amplifying an L-band signal;

a first loopback means provided between an input to the first optical fiber amplification unit or an output from the first optical fiber amplification unit and an input to the third optical fiber amplification unit or an output from the third optical fiber amplification unit; and a second loopback means provided between an input to the second optical fiber amplification unit or an output from the second optical fiber amplification unit and an input to the fourth optical fiber amplification unit or an output from the fourth optical fiber amplification unit.

A transmission path fiber monitoring method according to the present invention is a monitoring method for a C+L-band repeater inserted between a first transmission path fiber and a second transmission path fiber, the C+L-band repeater including a first optical fiber amplification unit inserted in a first line, and amplifying a C-band signal, a second optical fiber amplification unit inserted in a second line, and amplifying an L-band signal, a third optical fiber amplification unit inserted in a third line, and amplifying a C-band signal, and a fourth optical fiber amplification unit inserted in a fourth line, and amplifying an L-band signal, the method includes diagnosing a state of a transmission path by connecting an input to the first optical fiber amplification unit or an output from the first optical fiber amplification unit with an input to the third optical fiber amplification unit or an output from the third optical fiber amplification unit.

Advantageous Effects of Invention

According to the present invention, an optical repeater, a transmission path fiber monitoring method, and an optical transmission system that are capable of implementing OTDR while suppressing an insertion loss increase of a main signal can be provided.

EXAMPLE EMBODIMENT

Preferred example embodiments of the present invention will be described in detail with reference to the drawings. Before describing a specific example embodiment, an optical repeater according to a high-level concept example embodiment of the present invention is described.

Figure 1:
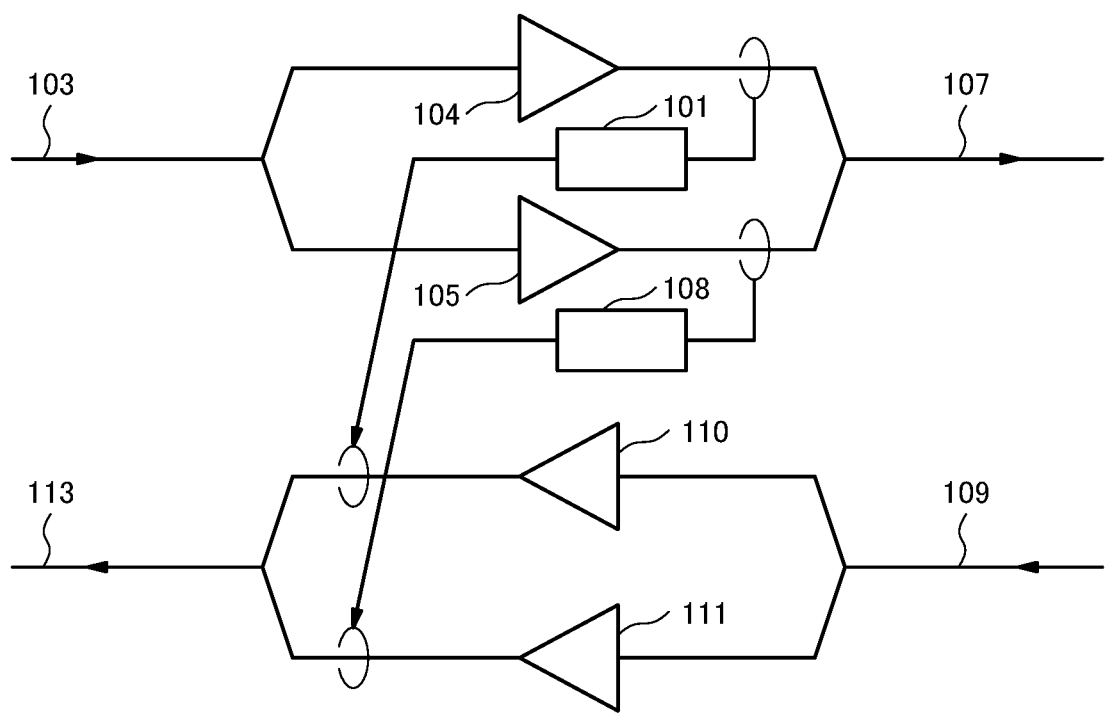
FIG. 1 is a configuration diagram for describing an optical repeater according to a high-level example embodiment of the present invention.

FIG. 1 is a configuration diagram for describing an optical repeater according to a high-level concept of the present invention. The optical repeater in FIG. 1 is a C+L-band repeater inserted between a first transmission path fiber 103 or 107 and a second transmission path fiber 109 or 113. The optical repeater in FIG. 1 includes a first optical fiber amplification unit 104 inserted in a first line, and amplifying a C-band signal, a second optical fiber amplification unit 105 inserted in a second line, and amplifying an L-band signal, a third optical fiber amplification unit 110 inserted in a third line, and amplifying a C-band signal, and a fourth optical fiber amplification unit 111 inserted in a fourth line, and amplifying an L-band signal. The optical repeater in FIG. 1 further includes a first loopback means 101 provided between an input to the first optical fiber amplification unit 104 or an output from the first optical fiber amplification unit 104 and an input to the third optical fiber amplification unit 110 or an output from the third optical fiber amplification unit 110. The optical repeater in FIG. 1 further includes a second loopback means 108 provided between an input to the second optical fiber amplification unit 105 or an output from the second optical fiber amplification unit 105 and an input to the fourth optical fiber amplification unit 111 or an output from the fourth optical fiber amplification unit 111.

Although FIG. 1 illustrates a case where the first loopback means 101 is provided between the output from the first optical fiber amplification unit 104 and the output from the third optical fiber amplification unit 110, the present example embodiment is not limited to this. Although FIG. 1 illustrates a case where the second loopback means 108 is provided between the output from the second optical fiber amplification unit 105 and the output from the fourth optical fiber amplification unit 111, the present example embodiment is not limited to this.

According to the present example embodiment, the first loopback means 101 is provided between the input or output of the first optical fiber amplification unit 104 and the input or output of the third optical fiber amplification unit 110. According to the present example embodiment, the second loopback means 108 is provided between the input or output of the second optical fiber amplification unit 105 and the input or output of the fourth optical fiber amplification unit 111.

Thus, as compared with a case where a loopback circuit is provided between the first transmission path fiber 103 or 107 and the second transmission path fiber 109 or 113, an insertion loss of a common path of a C-band and an L-band or an L-band path can be lessened. It is possible to detect a fault of the L-band path with OTDR by an optical pulse of an L-band wavelength. A fault of a transmission path and a fault of the common path of the C-band and the L-band can be detected with OTDR by an optical pulse of a C-band wavelength, a path loss of an L-band main signal is reduced, and an optical signal to noise ratio (OSNR) after transmission can be improved. More specific example embodiments are described below.

First Example Embodiment

Next, an optical repeater, a transmission path fiber monitoring method, and an optical transmission system according to a first example embodiment of the present invention are described.

Figure 2:
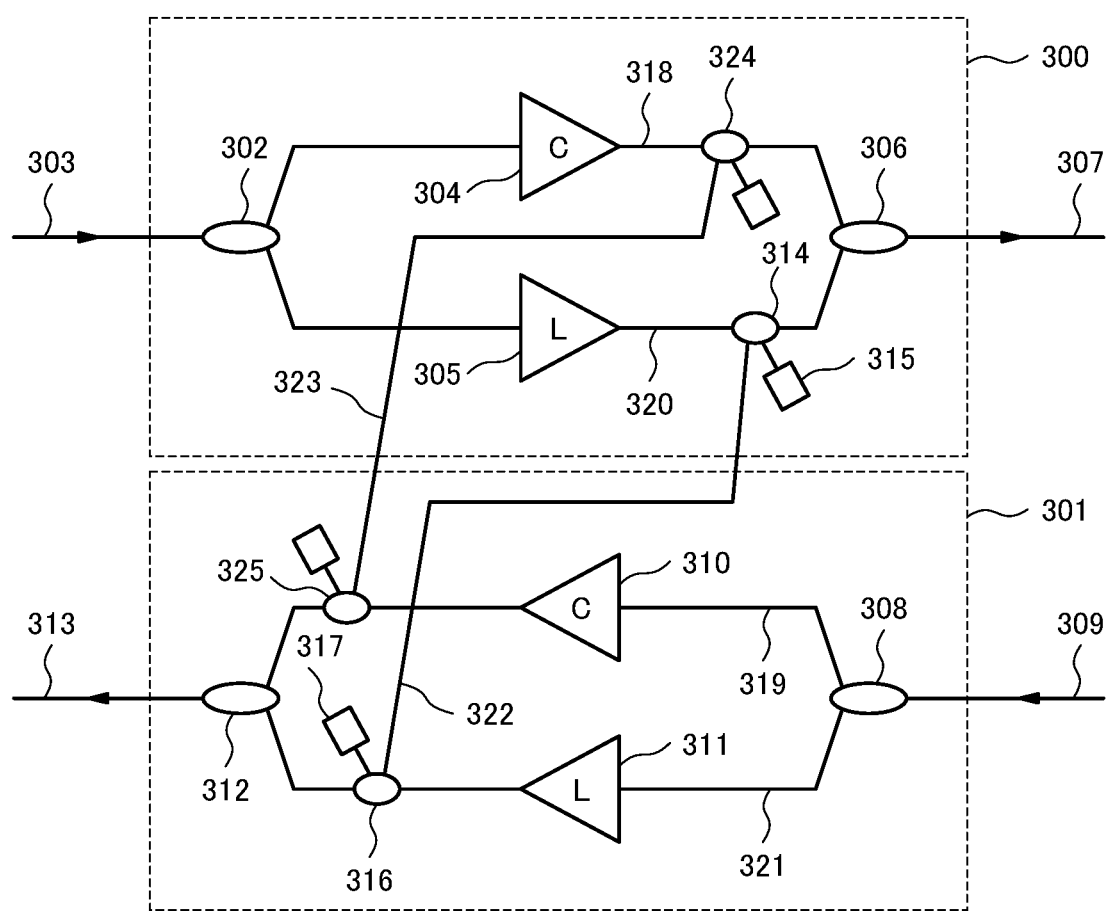
FIG. 2 is a configuration diagram for describing an optical repeater according to a first example embodiment.

FIG. 2 is a configuration diagram for describing an optical repeater according to the first example embodiment. The optical repeater in FIG. 2 is a C+L repeater equipped with a transmission-direction optical amplification circuit 300 and a reception-direction optical amplification circuit 301. Further, FIG. 2 is an example in which a loopback circuit has an output-to-output configuration.

A WDM demultiplexer 302 separates a signal of an optical transmission path 303 in a transmission direction into a C-band of a wavelength of 1525 nm to 1568 nm, and an L-band of a wavelength of 1568 nm to 1625 nm, and outputs separated signals to a C-band optical amplifier 304 and an L-band optical amplifier 305, respectively. The wavelength ranges described above indicate one example, and a wavelength range is not limited to such values and may fluctuate depending on a use method.

The C-band optical amplifier 304 amplifies a C-band optical input, and the L-band optical amplifier 305 amplifies an L-band optical input. The C-band optical amplifier 304 and the L-band optical amplifier 305 are each configured by an erbium doped fiber amplifier (EDFA) of which a profile is adjusted on each band. The C-band optical amplifier 304 and the L-band optical amplifier 305 are each equipped therein with an optical isolator, and blocks an optical input in an opposite direction.

An output of the C-band optical amplifier 304 and an output of the L-band optical amplifier 305 are multiplexed by a WDM multiplexer 306, and output to an optical transmission path 307 in the transmission direction.

A WDM demultiplexer 308, an optical transmission path 309 in a reception direction, a C-band optical amplifier 310, an L-band optical amplifier 311, a WDM multiplexer 312, and an optical transmission path 313 in the reception direction of the reception-direction optical amplification circuit 301 have the same function as that of the transmission-direction optical amplification circuit 300 except for a device disposition direction. Specifically, the WDM demultiplexer 308 separates a signal of the optical transmission path 309 in the reception direction into the C-band of a wavelength of 1525 nm to 1568 nm, and the L-band of a wavelength of 1568 nm to 1625 nm, and outputs the separated signals to an input of the C-band optical amplifier 310 and an input of the L-band optical amplifier 311, respectively. A wavelength range is not limited to such values, and may fluctuate depending on a use method.

The C-band optical amplifier 310 amplifies a C-band optical input, and the L-band optical amplifier 311 amplifies an L-band optical input. The C-band optical amplifier 310 and the L-band optical amplifier 311 are each configured by an erbium doped fiber amplifier (EDFA) of which a profile is adjusted on each band. The C-band optical amplifier 310 and the L-band optical amplifier 311 are each equipped therein with an optical isolator, and blocks an optical input in an opposite direction.

An output of each of the C-band optical amplifier 310 and the L-band optical amplifier 311 is multiplexed by the WDM multiplexer 312, and output to the optical transmission path 313 in the reception direction.

An optical coupler 314 outputs, to the WDM multiplexer 306, an optical input from the L-band optical amplifier 305. The optical coupler 314 inputs, from the WDM multiplexer 306, back-scattering light resulting from an optical measurement pulse of OTDR generated in the optical transmission path 307 in the transmission direction, and outputs the back-scattering light to an optical coupler 316. A split ratio (an output ratio of a split path to a main path) of the optical couplers 314 and 316 lower than that of optical couplers 324 and 325 is selected in such a way that a loss of a main signal path becomes as low as possible. In FIG. 2, when an optical signal to noise ratio (OSNR) after transmission is the same on the C-band and the L-band, an output of an L-band EDFA needs to be raised on the L-band than on the C-band, or a loss amount of the L-band path needs to be reduced. Thus, the optical couplers 314 and 316 used for an L-band loopback circuit 322 have a low split ratio (an output ratio of a split path to a main path) and a low path loss of an L-band main signal as compared with the optical couplers 324 and 325 used for a C-band loopback circuit 323.

In this way, a transmission loss of a main path can be decreased by decreasing a split ratio of an optical coupler, and it is possible to further decrease an insertion loss of an L-band main signal in the configuration in FIG. 2.

An optical terminator 315 has an object of attenuating optical power of all wavelengths, and preventing an output of the L-band optical amplifier 305 from being reflected to the reception-direction optical amplification circuit 301. Although an example in which unused ports of the optical couplers 314 and 316 are connected to an optical terminator is illustrated in the description of this description, the present invention is not limited to connection of an optical terminator, and may be used for another purpose.

The optical coupler 316 is connected to the L-band optical amplifier 311, the optical coupler 314, the WDM multiplexer 312, and an optical terminator 317, and has the same function as that of the transmission-direction optical amplification circuit 300 except for a device disposition direction. The optical coupler 316 outputs, to the WDM multiplexer 312, an optical output from the L-band optical amplifier 311. The optical coupler 316 inputs, from the WDM multiplexer 312, back-scattering light resulting from an optical measurement pulse of OTDR generated in the optical transmission path 313 in the reception direction, and outputs the back-scattering light to the optical coupler 314.

(Description of Operation)

Figure 3:
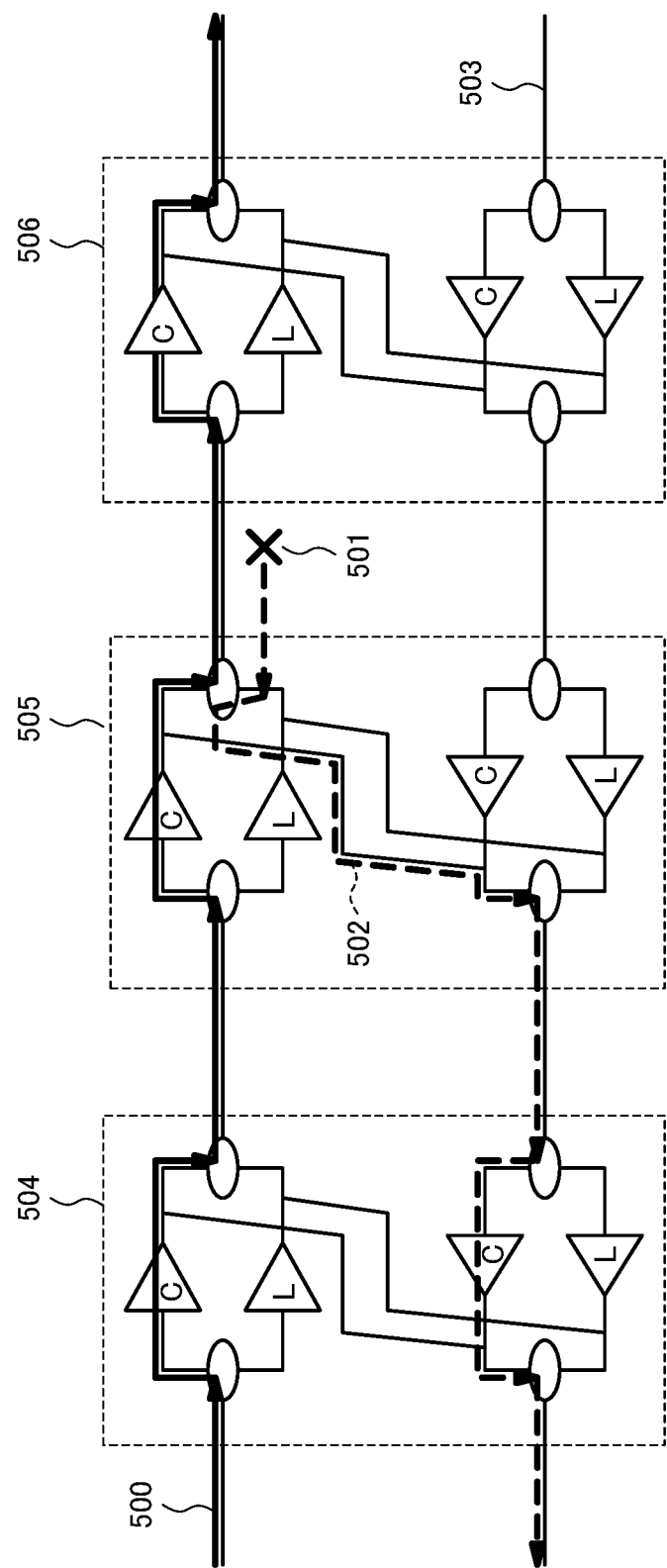
FIG. 3 is a conceptual diagram for describing OTDR using an optical pulse of a C-band wavelength with regard to the optical repeater according to the first example embodiment.

An operation when OTDR by an optical pulse of a C-band wavelength is executed is described with reference to FIG. 3. Herein, it is assumed that each of repeaters 504, 505, and 506 constituting FIG. 3 is the repeater in FIG. 2.

OTDR measurement equipment outputs an optical pulse of a C-band wavelength to an optical transmission path 500 constituted of a plurality of C+L repeaters. Back-scattering light 501 generated on the optical transmission path is returned in the reception direction by a C-band loopback circuit 502, and input to the OTDR measurement equipment. A state of a transmission path can be diagnosed by acquiring a cable trace for each repeater span from an attenuation amount of the back-scattering light 501 and a reception time of the pulse. When there is a failure or error connection on a C-band path or a common path of a C-band and an L-band of a C+L repeater, cable traces in and after this repeater are unsuccessfully acquired. The unsuccessful acquisition of cable traces in and after such a repeater reveals that there is a failure or error connection in the repeater.

In this way, OTDR by an optical pulse of a C-band wavelength is executed for state monitoring of the optical transmission paths 500 and 503, and a cable trace is acquired by using the C-band loopback circuit 502.

Figure 4:
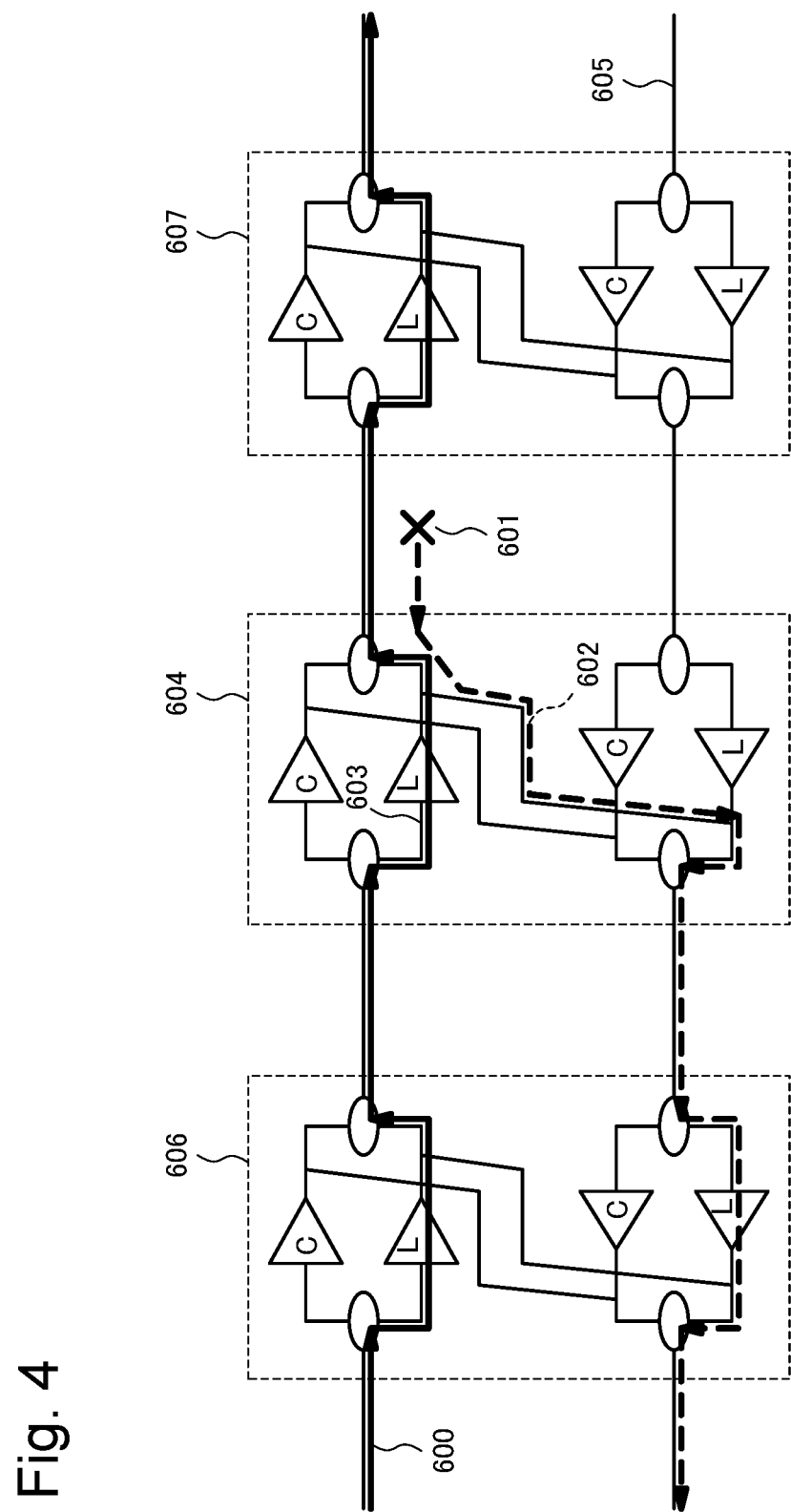
FIG. 4 is a conceptual diagram for describing OTDR using an optical pulse of an L-band wavelength with regard to the optical repeater according to the first example embodiment.

An operation when OTDR by an L-band wavelength optical pulse is executed is described with reference to FIG. 4. Herein, it is assumed that each of repeaters 606, 604, and 607 constituting FIG. 4 is the repeater in FIG. 2.

The OTDR measurement equipment outputs an optical pulse of an L-band wavelength to an optical transmission path 600 constituted of a plurality of C+L repeaters. Back-scattering light 601 generated on the optical transmission path is returned in the reception direction by an L-band loopback circuit 602, and input to the OTDR measurement equipment. When there is a failure on an L-band path of a C+L repeater, cable traces in and after this repeater are unsuccessfully acquired. The unsuccessful acquisition of cable traces in and after such a repeater reveals that there is a failure or error connection in the repeater.

When the L-band loopback circuit 602 can loop back a degree of an optical power amount with which presence or absence of cable traces in and after the C+L repeater 604 can be recognized, the L-band loopback circuit 602 can determine a state of the L-band path inside the C+L repeater 604 with the OTDR measurement equipment. Thus, it is not necessary to amplify, with the C+L repeater 604, back-scattering light generated on the optical transmission paths 600 and 605. Therefore, the L-band loopback circuit 602 is used for state monitoring of an L-band path 603 inside a repeater.

As above, a function is shared in such a way as to perform, with OTDR by an optical pulse of a C-band wavelength, monitoring of a transmission path and a C-band path inside a repeater, and implement, with OTDR by an optical pulse of an L-band wavelength, monitoring of an L-band path.

An operation when OTDR is executed is described in detail with reference to FIG. 2.

An optical pulse output by the OTDR measurement equipment is input to the transmission-direction optical amplification circuit 300 from the optical transmission path 303 in the transmission direction. The optical pulse is separated into the C-band or the L-band by the WDM demultiplexer 302. When an L-band wavelength optical pulse is input as an example, the optical pulse is amplified by the L-band optical amplifier 305, and input to the optical coupler 314. The optical pulse is split into the WDM multiplexer 306 and the optical terminator 315 by the optical coupler 314, and terminated by the optical terminator 315. The WDM multiplexer 306 inputs the optical pulse from the optical coupler 314, and outputs the optical pulse to the optical transmission path 307 in the transmission direction.

In this way, the optical pulse from the OTDR measurement equipment reaches an opposite station via a plurality of C+L repeaters. On the other hand, back-scattering light generated on the optical transmission path 307 in the transmission direction by the optical pulse of the L-band wavelength is input to the WDM multiplexer 306, and output to the optical coupler 314. The optical coupler 314 outputs the back-scattering light by splitting the back-scattering light into the L-band optical amplifier 305 and the optical coupler 316, but the back-scattering light toward the L-band optical amplifier 305 is blocked by the optical isolator in the L-band optical amplifier 305. The back-scattering light output by the optical coupler 314 is output by the optical coupler 316 by being split into the optical terminator 317 and the WDM multiplexer 312, but terminated by the optical terminator 317. The WDM multiplexer 312 outputs, to the optical transmission path 313 in the reception direction, the back-scattering light input from the optical coupler 316.

In consequence, the back-scattering light of the optical pulse output from the OTDR measurement equipment is transmitted in the reception direction through a loopback circuit, a cable loss trace of the back-scattering light is measured by the OTDR measurement equipment, and it becomes possible to detect a fault and an attenuation amount of an optical transmission path from a measurement time.

Figure 5A:
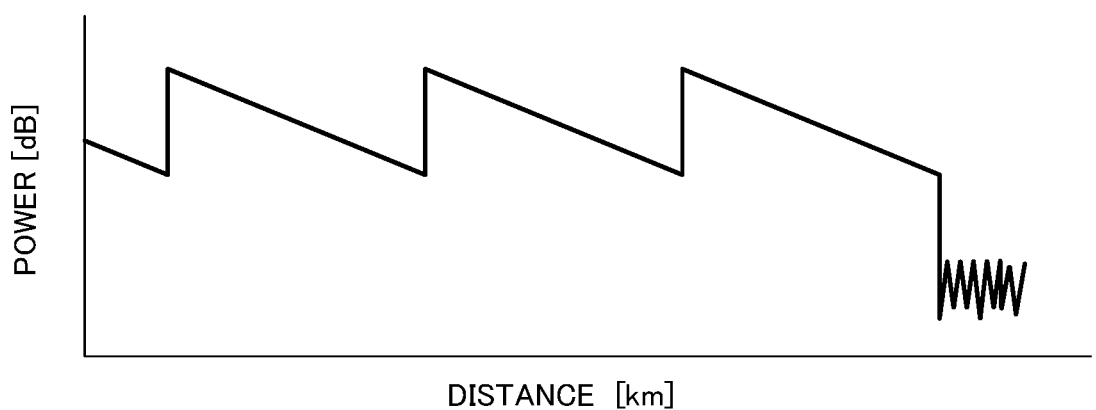
FIG. 5A is a graph for describing one example of a cable trace in a normal state.
Figure 5B:
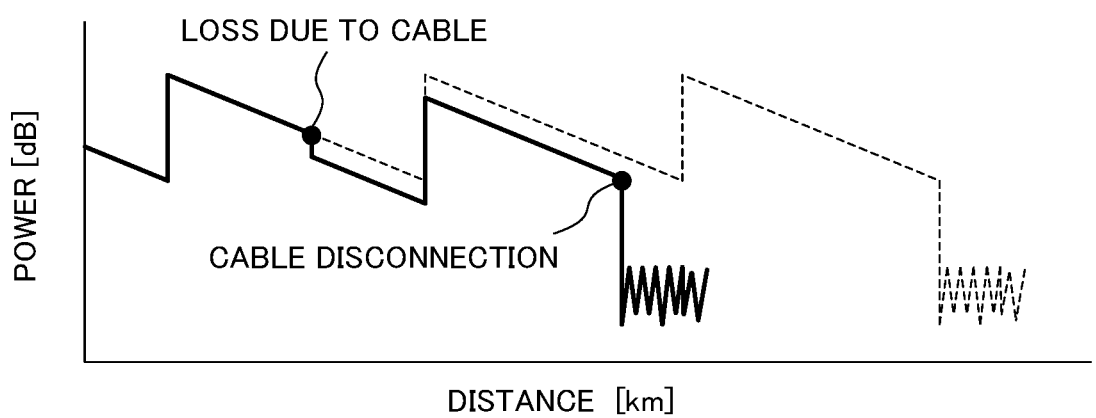
FIG. 5B is a graph for describing one example of a cable trace during a cable fault.

FIGS. 5A and 5B are examples of implementing OTDR measurement with a monitoring signal of the C-band wavelength in FIGS. 2 and 3. A cable trace is indicated by a distance calculated from an optical pulse reception delay time and an optical pulse reception level (power). FIG. 5A illustrates a cable trace example in a normal state. When a cable fault resulting from cable disconnection occurs, a cable trace becomes as in FIG. 5B, and it is possible to identify a fault position. A state of a repeater output can also be diagnosed by such a method as monitoring a reduction amount of a cable trace.

Figure 6:
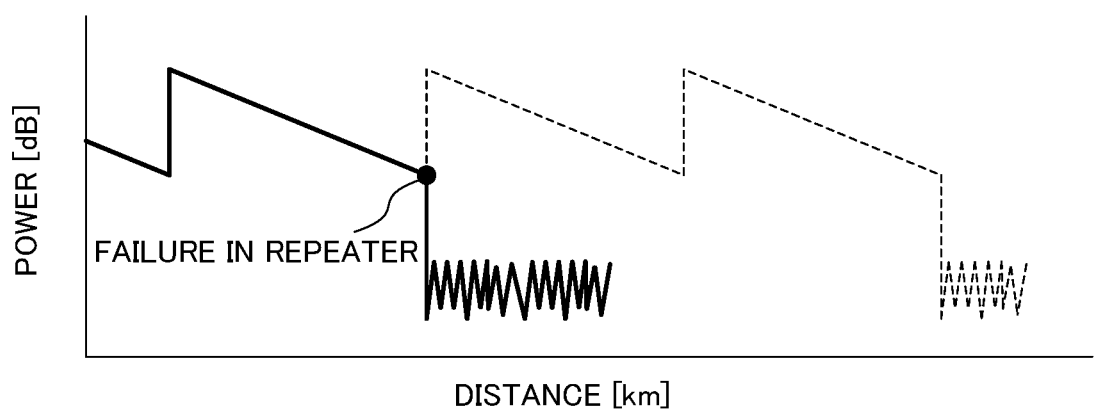
FIG. 6 is a graph for describing one example of a cable trace during a repeater failure.

FIG. 6 is an example of implementing OTDR measurement with a monitoring signal of the L-band wavelength in FIGS. 2 and 4. A cable trace is indicated by a distance calculated from an optical pulse reception delay time and an optical pulse reception level (power). When a failure occurs in an L-band path inside a repeater, a cable trace becomes FIG. 6, and a repeater with a failure occurring in the L-band path can be identified.

Advantageous Effect of Example Embodiment

According to the present example embodiment, an insertion loss of a common path of a C-band and an L-band or an L-band path can be lessened. It is possible to detect a fault of the L-band path with OTDR by an optical pulse of an L-band wavelength. A fault of a transmission path and a fault of the common path of the C-band and the L-band can be detected with OTDR by an optical pulse of a C-band wavelength, a path loss of an L-band main signal is reduced, and an OSNR after transmission can be improved.

In other words, according to the present example embodiment, the number of insertion devices and an insertion loss of an L-band main signal path can be minimized by sharing a monitoring function between the C-band loopback circuit 323 and the L-band loopback circuit 322. A transmission path, C-band paths 318 and 319 inside a repeater, and L-band paths 320 and 321 inside a repeater can be individually diagnosed by using the C-band loopback circuit 323 or the L-band loopback circuit 322. Output power of both or one of the C-band and the L-band can be diagnosed by using the C-band loopback circuit 323 or the L-band loopback circuit 322.

According to the present example embodiment, in a repeater that performs division and amplification for each wavelength band, a diagnosis function is shared between the C-band loopback circuit 323 and the L-band loopback circuit 322 according to an amplification characteristic and a transmission characteristic of the repeater. A repeater and a monitoring method thereof that can maximize transmission performance can be provided by application of the loopback circuit.

Second Example Embodiment

Next, an optical repeater, a transmission path fiber monitoring method, and an optical transmission system according to a second example embodiment of the present invention are described.

Figure 7:
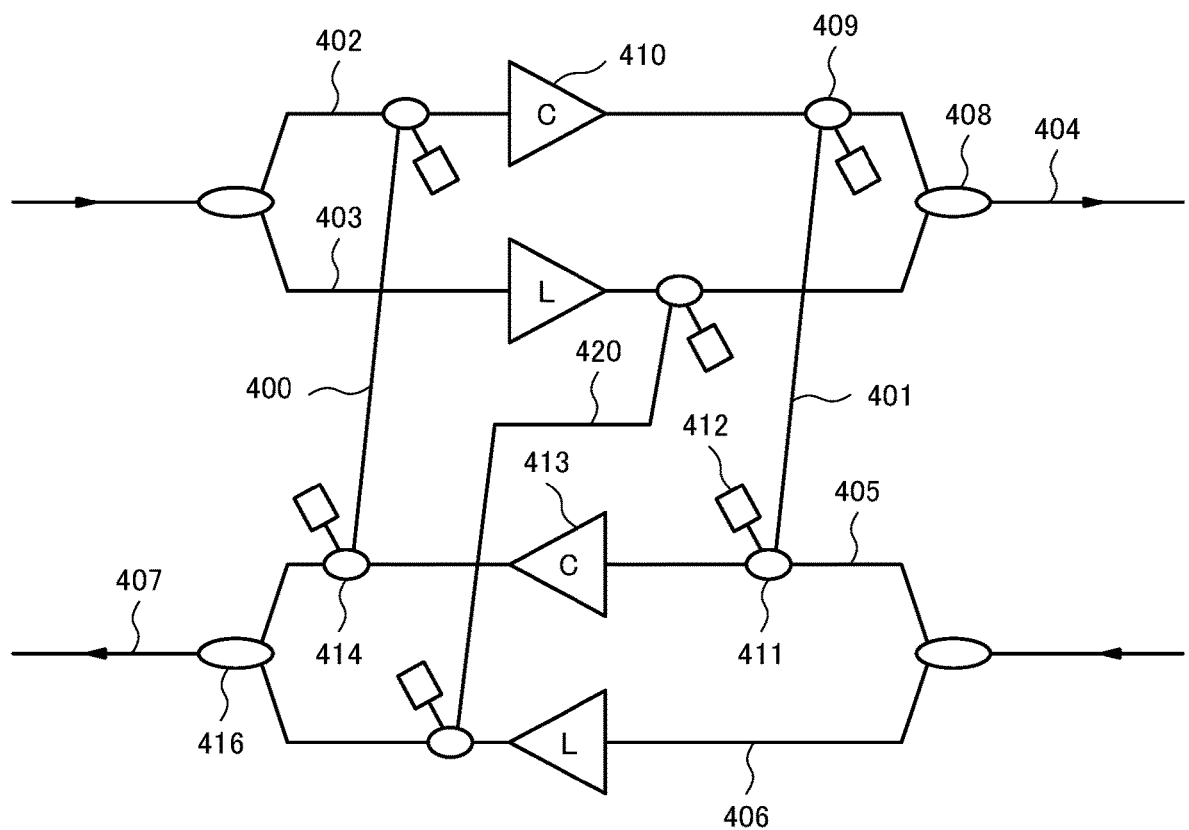
FIG. 7 is a configuration diagram for describing an optical repeater according to a second example embodiment.

FIG. 7 is a configuration diagram for describing an optical repeater according to the second example embodiment. FIG. 7 is an example in which a C-band loopback circuit in FIG. 2 is replaced with C-band loopback circuits 400 and 401 each having an output-to-input configuration.

When an OSNR after transmission is the same on a C-band and an L-band, C-band paths 402 and 405 have a larger permissible loss amount as compared with L-band paths 403 and 406. Thus, the number of components of a loopback circuit can be increased on the C-band paths 402 and 405 in contrast to the L-band paths 403 and 406. Accordingly, when a C-band loopback circuit is replaced with an output-to-input configuration, insertion components on the C-band path increase, but an optical amplifier can be passed through, and an optical pulse power level received by OTDR measurement equipment can be raised. Thus, it is possible to shorten a measurement time.

Even with such a configuration, it is possible to diagnose an L-band path inside a repeater by presence or absence of a subsequent-stage trace, and, therefore, an output-to-output configuration that can diminish insertion components on the L-band path can be applied.

The optical repeater in FIG. 7 is a C+L repeater equipped with a transmission-direction optical amplification circuit and a reception-direction optical amplification circuit. A WDM demultiplexer separates a signal of an optical transmission path in a transmission direction into a C-band of a wavelength of 1525 nm to 1568 nm, and an L-band of a wavelength of 1568 nm to 1625 nm, and outputs the separated signals to a C-band optical amplifier 410 in a transmission direction and an L-band optical amplifier in the transmission direction, respectively. The wavelength ranges described above indicate one example, and a wavelength range is not limited to such values and may fluctuate depending on a use method.

The C-band optical amplifier 410 amplifies a C-band optical input, and the L-band optical amplifier amplifies an L-band optical input. The C-band optical amplifier 410 and the L-band optical amplifier are each configured by an erbium doped fiber amplifier (EDFA) of which a profile is adjusted on each band. The C-band optical amplifier 410 and the L-band optical amplifier are each equipped therein with an optical isolator, and blocks an optical input in an opposite direction.

An output of the C-band optical amplifier 410 and an output of the L-band optical amplifier are multiplexed by a WDM multiplexer 408, and output to an optical transmission path 404 in the transmission direction.

A WDM demultiplexer, an optical transmission path in a reception direction, a C-band optical amplifier 413 in the reception direction, an L-band optical amplifier, a WDM multiplexer 416, and an optical transmission path 407 in the reception direction of the reception-direction optical amplification circuit have the same function as that of the transmission-direction optical amplification circuit except for a device disposition direction. Specifically, the WDM demultiplexer separates a signal of the optical transmission path in the reception direction into the C-band of a wavelength of 1525 nm to 1568 nm, and the L-band of a wavelength of 1568 nm to 1625 nm, and outputs separated signals to an input of the C-band optical amplifier 413 and an input of the L-band optical amplifier, respectively. A wavelength range is not limited to such values, and may fluctuate depending on a use method.

The C-band optical amplifier 413 amplifies a C-band optical input, and the L-band optical amplifier amplifies an L-band optical input. The C-band optical amplifier 413 and the L-band optical amplifier are each configured by an erbium doped fiber amplifier (EDFA) of which a profile is adjusted on each band. The C-band optical amplifier 413 and the L-band optical amplifier are each equipped therein with an optical isolator, and blocks an optical input in an opposite direction.

Outputs of the C-band optical amplifier 413 and the L-band optical amplifier are multiplexed by the WDM multiplexer 416, and output to the optical transmission path 407 in the reception direction.

As in a configuration in FIG. 2, the configuration in FIG. 7 monitors states of the optical transmission paths 404 and 407 by executing OTDR with a C-band wavelength optical pulse traveling via the C-band loopback circuits 400 and 401. Further, the configuration in FIG. 7 monitors states of the L-band paths 403 and 406 inside the repeater by executing OTDR with an L-band wavelength optical pulse traveling via an L-band loopback circuit 420.

Back-scattering light generated on the optical transmission path 404 is output to an optical coupler 409 via the WDM multiplexer 408, and input to an optical coupler 411 via the C-band loopback circuit 401. The optical coupler 411 splits an optical input being input from the optical coupler 409, into an optical terminator 412 and the C-band optical amplifier 413 in the reception direction. The optical terminator 412 terminates the back-scattering light, the C-band optical amplifier 413 in the reception direction amplifies an optical power level of the back-scattering light, and the back-scattering light is output to the optical transmission path 407 via an optical coupler 414 and the WDM multiplexer 416. As in OTDR in the transmission direction, the C-band loopback circuit 400 amplifies back-scattering light generated on the optical transmission path 407 with the C-band optical amplifier 410 in the transmission direction by OTDR in the reception direction, and then outputs the amplified back-scattering light to the optical transmission path 404.

Advantageous Effect of Example Embodiment

According to the present example embodiment, as in the first example embodiment, an insertion loss of a common path of a C-band and an L-band or an L-band path can be lessened. As in the first example embodiment, it is possible to detect a fault of the L-band path with OTDR by an optical pulse of an L-band wavelength. As in the first example embodiment, a fault of a transmission path and a fault of the common path of the C-band and the L-band can be detected with OTDR by an optical pulse of a C-band wavelength, a path loss of an L-band main signal is reduced, and an OSNR after transmission can be improved.

Furthermore, according to the present example embodiment, it becomes possible to monitor an L-band path inside a repeater while minimizing an insertion loss of an L-band main signal.

While the preferred example embodiments of the present invention have been described above, the present invention is not limited thereto. According to the example embodiment of the present invention, an optical repeater including a loopback circuit being capable of monitoring an optical transmission path in wide-band optical relay transmission can be achieved. According to the example embodiment of the present invention, a system being capable of optical amplification over a plurality of bands and being capable of detecting a path fault on each band can be provided.

Generally, as compared with a C-band optical amplifier, an L-band repeater has a poor NF characteristic and poor output power efficiency for excitation light. In order to maximize an OSNR after transmission of the C-band and the L-band, it is important to lessen an insertion loss of an L-band path. According to the example embodiment of the present invention, an optical repeater including a loopback circuit that can not only lessen insertion devices as much as possible and decrease an influence on a main signal but also implement OTDR can be provided.

It goes without saying that various modifications of the present invention are possible within the scope of the invention described in claims, and also fall within the scope of the present invention.

The whole or part of the example embodiments disclosed above can be described as, but not limited to, the following supplementary notes.

(Supplementary Note 1) An optical repeater, which is a C+L-band repeater inserted between a first transmission path fiber and a second transmission path fiber, including:

a first optical fiber amplification unit inserted in a first line, and amplifying a C-band signal;

a second optical fiber amplification unit inserted in a second line, and amplifying an L-band signal;

a third optical fiber amplification unit inserted in a third line, and amplifying a C-band signal;

a fourth optical fiber amplification unit inserted in a fourth line, and amplifying an L-band signal;

a first loopback means provided between an input to the first optical fiber amplification unit or an output from the first optical fiber amplification unit and an input to the third optical fiber amplification unit or an output from the third optical fiber amplification unit; and a second loopback means provided between an input to the second optical fiber amplification unit or an output from the second optical fiber amplification unit and an input to the fourth optical fiber amplification unit or an output from the fourth optical fiber amplification unit.

(Supplementary Note 2) The optical repeater according to Supplementary Note 1, further including:

a first splitter that splits an optical signal from the first transmission path fiber into the first line and the second line;

a second splitter that splits an optical signal from the second transmission path fiber into the third line and the fourth line;

a first coupler that couples optical signals from the first line and the second line together; and a second coupler that couples optical signals from the third line and the fourth line together.

(Supplementary Note 3) The optical repeater according to Supplementary Note 1 or 2, wherein the first loopback means from the first line to the third line and the second loopback means from the second line to the fourth line have different connection configurations.

(Supplementary Note 4) The optical repeater according to Supplementary Note 3, wherein the first loopback means and the second loopback means have separate monitoring targets and monitoring items.

(Supplementary Note 5) An optical transmission system including the optical repeater according to Supplementary Note 3 or 4, wherein transmission performance of a wavelength band of a part of a plurality of optical amplification bands is adjusted.

(Supplementary Note 6) The optical repeater according to any one of Supplementary Notes 1 to 4, wherein a split ratio at which the second loopback means splits from an input to the second optical fiber amplification unit or an output from the second optical fiber amplification unit is set in such a way that an output to a loopback side decreases as compared with a split ratio at which the first loopback means splits from an input to the first optical fiber amplification unit or an output from the first optical fiber amplification unit.

(Supplementary Note 7) An optical transmission system including the optical repeater according to any one of Supplementary Notes 1 to 4, and 6, a first transmission path fiber, and a second transmission path fiber.

(Supplementary Note 8) A transmission path fiber monitoring method, which is a monitoring method for a C+L-band repeater inserted between a first transmission path fiber and a second transmission path fiber, the C+L-band repeater including a first optical fiber amplification unit inserted in a first line, and amplifying a C-band signal, a second optical fiber amplification unit inserted in a second line, and amplifying an L-band signal, a third optical fiber amplification unit inserted in a third line, and amplifying a C-band signal, and a fourth optical fiber amplification unit inserted in a fourth line, and amplifying an L-band signal, the method including diagnosing a state of a transmission path by connecting an input to the first optical fiber amplification unit or an output from the first optical fiber amplification unit with an input to the third optical fiber amplification unit or an output from the third optical fiber amplification unit.

(Supplementary Note 9) The transmission path fiber monitoring method according to Supplementary Note 8, further including diagnosing a state of a transmission path by connecting an input to the second optical fiber amplification unit or an output from the second optical fiber amplification unit and an input to the fourth optical fiber amplification unit or an output from the fourth optical fiber amplification unit.

(Supplementary Note 10) The transmission path fiber monitoring method according to Supplementary Note 9, wherein a split ratio of splitting from an input to the second optical fiber amplification unit or an output from the second optical fiber amplification unit to an input to the fourth optical fiber amplification unit or an output from the fourth optical fiber amplification unit is set in such a way that an output to a loopback side decreases as compared with a split ratio of splitting from an input to the first optical fiber amplification unit or an output from the first optical fiber amplification unit to an input to the third optical fiber amplification unit or an output from the third optical fiber amplification unit.

(Supplementary Note 11) The transmission path fiber monitoring method according to Supplementary Note 8 or 9, wherein first loopback means from the first line to the third line and second loopback means from the second line to the fourth line have different connection configurations.

(Supplementary Note 12) The transmission path fiber monitoring method according to Supplementary Note 11, wherein the first loopback means and the second loopback means have separate monitoring targets and monitoring items.

(Supplementary Note 13) A monitoring method for an optical transmission system including the C+L-band repeater according to Supplementary Note 11 or 12, wherein transmission performance of a wavelength band of a part of a plurality of optical amplification bands is adjusted.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

300 Transmission-direction optical amplification circuit
301 Reception-direction optical amplification circuit
302, 308 WDM demultiplexer
303, 307, 309, 313 Optical transmission path
304, 310 C-band optical amplifier
305, 311 L-band optical amplifier
306, 312 WDM multiplexer
322 L-band loopback circuit
323 C-band loopback circuit

The invention claimed is:

1. An optical repeater, which is a C+L-band repeater inserted between a first transmission path fiber and a second transmission path fiber, the optical repeater comprising:

a first optical fiber amplification unit inserted in a first line, and configured to amplify a C-band signal;

a second optical fiber amplification unit inserted in a second line, and configured to amplify an L-band signal;

a third optical fiber amplification unit inserted in a third line, and configured to amplify a C-band signal;

a fourth optical fiber amplification unit inserted in a fourth line, and configured to amplify an L-band signal;

a first loopback unit provided between an input to the first optical fiber amplification unit or an output from the first optical fiber amplification unit and an input to the third optical fiber amplification unit or an output from the third optical fiber amplification unit; and a second loopback unit provided between an input to the second optical fiber amplification unit or an output from the second optical fiber amplification unit and an input to the fourth optical fiber amplification unit or an output from the fourth optical fiber amplification unit.

2. The optical repeater according to claim 1, further comprising:
   a first splitter configured to split an optical signal from the first transmission path fiber into the first line and the second line;
   a second splitter configured to split an optical signal from the second transmission path fiber into the third line and the fourth line;
   a first coupler that configured to couple optical signals from the first line and the second line together; and
   a second coupler configured to couple optical signals from the third line and the fourth line together.

3. The optical repeater according to claim 1, wherein the first loopback unit from the first line to the third line and the second loopback unit from the second line to the fourth line have different connection configurations.

4. The optical repeater according to claim 3, wherein the first loopback unit and the second loopback unit have separate monitoring targets and monitoring items.

5. An optical transmission system comprising the optical repeater according to claim 3, wherein the optical transmission system is configured to adjust transmission performance of a wavelength band of a part of a plurality of optical amplification bands.

6. The optical repeater according to claim 1, wherein a split ratio at which the second loopback unit splits from an input to the second optical fiber amplification unit or an output from the second optical fiber amplification unit is set in such a way that an output to a loopback side decreases as compared with a split ratio at which the first loopback unit splits from an input to the first optical fiber amplification unit or an output from the first optical fiber amplification unit.

7. An optical transmission system comprising the optical repeater according to claim 1, a first transmission path fiber, and a second transmission path fiber.

8. A transmission path fiber monitoring method, which is a monitoring method for a C+L-band repeater inserted between a first transmission path fiber and a second transmission path fiber, the C+L-band repeater including a first optical fiber amplification unit inserted in a first line, and amplifying a C-band signal, a second optical fiber amplification unit inserted in a second line, and amplifying an L-band signal, a third optical fiber amplification unit inserted in a third line, and amplifying a C-band signal, and a fourth optical fiber amplification unit inserted in a fourth line, and amplifying an L-band signal, the method comprising:
   diagnosing a state of a transmission path by connecting an input to the first optical fiber amplification unit or an output from the first optical fiber amplification unit with an input to the third optical fiber amplification unit or an output from the third optical fiber amplification unit.

9. The transmission path fiber monitoring method according to claim 8, the method further comprising diagnosing a state of a transmission path by connecting an input to the second optical fiber amplification unit or an output from the second optical fiber amplification unit and an input to the fourth optical fiber amplification unit or an output from the fourth optical fiber amplification unit.

10. The transmission path fiber monitoring method according to claim 9, wherein a split ratio of splitting from an input to the second optical fiber amplification unit or an output from the second optical fiber amplification unit to an input to the fourth optical fiber amplification unit or an output from the fourth optical fiber amplification unit is set in such a way that an output to a loopback side decreases as compared with a split ratio of splitting from an input to the first optical fiber amplification unit or an output from the first optical fiber amplification unit to an input to the third optical fiber amplification unit or an output from the third optical fiber amplification unit.

11. The transmission path fiber monitoring method according to claim 8, wherein first loopback unit from the first line to the third line and second loopback unit from the second line to the fourth line have different connection configurations.

12. The transmission path fiber monitoring method according to claim 11, wherein the first loopback unit and the second loopback unit have separate monitoring targets and monitoring items.

13. A monitoring method for an optical transmission system including the C+L-band repeater according to claim 11, wherein transmission performance of a wavelength band of a part of a plurality of optical amplification bands is adjusted.

* * * * *